United States Patent
Hwang et al.

(10) Patent No.: US 8,818,181 B1
(45) Date of Patent: Aug. 26, 2014

(54) CAMERA MODULE, AND POSITION DETECTOR AND POSITION DETECTION METHOD USED IN THE CAMERA MODULE

(71) Applicant: Samsung Electronics Co., Ltd., Suwon-si (KR)

(72) Inventors: Young-jae Hwang, Suwon-si (KR); Sung Park, Suwon-si (KR); Kwang-seok Byon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/182,489

(22) Filed: Feb. 18, 2014

(30) Foreign Application Priority Data

Aug. 19, 2013 (KR) .................... 10-2013-0098131

(51) Int. Cl.
- *G03B 17/00* (2006.01)
- *G01B 7/14* (2006.01)
- *G03B 17/12* (2006.01)
- *G01B 7/00* (2006.01)

(52) U.S. Cl.
CPC .............. *G01B 7/003* (2013.01); *G03B 17/12* (2013.01)
USPC ........................................ 396/55; 324/207.2

(58) Field of Classification Search
USPC .......... 396/55; 73/DIG. 3; 324/207.2, 207.22, 324/207.24
See application file for complete search history.

(56) References Cited

U.S. PATENT DOCUMENTS

| | | | |
|---|---|---|---|
| 6,856,477 B2 * | 2/2005 | Morimoto | 359/824 |
| 2004/0021458 A1 * | 2/2004 | Imamura | 324/207.2 |
| 2011/0043193 A1 * | 2/2011 | Aebi et al. | 324/207.2 |
| 2013/0163973 A1 * | 6/2013 | Tanaka | 396/55 |
| 2013/0300336 A1 * | 11/2013 | Ishikawa et al. | 318/610 |

* cited by examiner

*Primary Examiner* — W B Perkey
(74) *Attorney, Agent, or Firm* — Drinker Biddle & Reath LLP

(57) ABSTRACT

Provided is a camera module including: a lens barrel including at least one lens group; a moving frame that includes the lens barrel, is movable in a first direction and in a second direction that is perpendicular to the first direction, and includes first and second magnets that are disposed on two sides in the first direction; a fixed frame that movably supports the moving frame and includes first and second magnetic sensors that are spaced apart from each other in the first direction to respectively correspond to the first and second magnets; and a position information generating unit that generates position information of the first and second magnets in the second direction based on a first detection signal detected by the first magnetic sensor and a second detection signal detected by the second magnetic sensor.

13 Claims, 11 Drawing Sheets

CAMERA MODULE, AND POSITION DETECTOR AND POSITION DETECTION METHOD USED IN THE CAMERA MODULE

CROSS-REFERENCE TO RELATED APPLICATIONS

This application claims the benefit of Korean Patent Application No. 10-2013-0098131, filed on Aug. 19, 2013, in the Korean Intellectual Property Office, the disclosure of which is incorporated herein in its entirety by reference.

This application is also related to an application being filed concurrently herewith, identified by application Ser. No. 14/182,544, entitled "Camera Module", and claiming the benefit of Korean Patent Application No. 10-2013-0098132, the disclosure of which is incorporated herein in its entirety by reference.

BACKGROUND

One or more embodiments of the present invention relate to a camera module and a position detector and a position detection method used in the camera module, and more particularly, to a camera module capable of accurately detecting a position of a lens barrel that is driven along at least two axes and a position detector and a position detection method used in the camera module.

A digital camera is a device capable of storing an image of a subject as a digital file such as a picture or a video image; examples of the digital camera include a digital still camera (DSC), a digital video camera (DVC), and a digital camera module mounted in a mobile phone.

As digital photographing apparatuses such as DSCs and/or DVCs are frequently supplied, consumer demand for high-quality still images and/or video is increasing. In particular, the demand for a camera module having an optical image stabilization (OIS) function for preventing a decrease in image sharpness due to handshaking of a user is increasing.

In order to perform optical image stabilization, a camera module may move a lens barrel two-dimensionally, in a direction that is perpendicular to an optical axis. To control two-dimensional movement of the lens barrel, a two-dimensional position of the lens barrel has to be detected accurately.

One of methods of detecting a two-dimensional position of the lens barrel may be a method of detecting a position by using a magnetic flux density of a magnet. For example, a magnetic sensor may be disposed spaced apart from a magnet that is used in moving a lens barrel a predetermined distance, and the position of the lens barrel may be detected by a detection signal detected by the magnetic sensor. At least two magnetic sensors may be disposed to detect a two-dimensional position of the lens barrel.

The above-described magnetic sensor may determine a position of the magnet that slidably moves with respect to the magnetic sensor. For example, while being spaced apart from the magnet by a predetermined distance in a first direction, the magnetic sensor determines a position of the magnet that moves in a second direction perpendicular to the first direction. The principle of determining a position of the magnet by using the magnetic sensor assumes a predetermined distance between the magnetic sensor and the magnet in the first direction, and accordingly, this method may not be used in determining a position of the magnet in the second direction under a condition where the distance between the magnetic sensor and the magnet is varied in the first direction. That is, if the distance between the magnetic sensor and the magnet in the first direction is varied, a detection signal detected by the magnetic sensor in the second direction is not constant.

SUMMARY

One or more embodiments disclosed herein include a camera module capable of accurately determining a position of a lens barrel that is moved along at least two axes and simplifying a structure for position determination, and a position detector and a position detection method used in the camera module.

Additional embodiments will be set forth in part in the description which follows and, in part, will be apparent from the description, or may be learned by practice of the presented embodiments.

According to one or more embodiments, a camera module includes: a lens barrel including at least one lens group; a moving frame that mounts the lens barrel, moves in a first direction and in a second direction that crosses the first direction, and includes first and second magnets that are disposed on two sides in the first direction; a fixed frame that movably supports the moving frame and includes first and second magnetic sensors that are spaced apart from each other in the first direction to respectively correspond to the first and second magnets; and a position information generating unit that generates position information of the first and second magnets in the second direction based on a first detection signal detected by the first magnetic sensor and a second detection signal detected by the second magnetic sensor.

The position information generating unit may generate position information of the moving frame in the second direction based on a third detection signal, which is a sum of the first detection signal and the second detection signal.

A sum of a distance between the first magnet and the first magnetic sensor in the first direction and a distance between the second magnet and the second magnetic sensor in the first direction may be constant.

The fixed frame may further include first and second driving coils that are included to respectively correspond to the first and second magnets and provide a driving force in the second direction of the moving frame.

The moving frame may further include a third magnet that is formed at least at a side in the second direction, and the fixed frame may further include a third driving coil that is included to correspond to the third magnet and provides a driving force in the first direction of the moving frame.

The moving frame may further include a fourth magnet that is formed at least at a side in the second direction, and the fixed frame may further include a fourth driving coil that is included to correspond to the fourth magnet and provides a driving force in an optical axis direction of the moving frame.

The first direction and the second direction may be orthogonal to each other.

The first direction may be perpendicular to an optical axis direction.

According to one or more embodiments, a position detector includes: at least one magnet that is moved in a first direction and in a second direction that crosses the first direction; first and second magnetic sensors that are disposed on two sides in the first direction of the at least one magnet; and a position information generating unit that generates position information of the at least one magnet in the second direction based on a first detection signal detected by the first magnetic sensor and a second detection signal detected by the second magnetic sensor.

The position information generating unit may generate position information of the at least one magnet in the second direction based on a third detection signal, which is a sum of the first detection signal and the second detection signal.

A sum of a distance between the first magnetic sensor and the at least one magnet in the first direction and a distance between the second magnetic sensor and the at least one magnet in the first direction may be constant.

The first direction and the second direction may be orthogonal to each other.

According to one or more embodiments of the present invention, a position detection method, includes: preparing first and second magnetic sensors that are spaced apart from each other in a first direction and at least one magnet that is disposed between the first and second magnetic sensors and is moved in the first direction and a second direction that crosses the first direction; generating a third detection signal by summing a first detection signal detected by the first magnetic sensor and a second detection signal detected by the second magnetic sensor; and determining a position of the at least one magnet in the second direction based on the third detection signal.

BRIEF DESCRIPTION OF THE DRAWINGS

These and/or other aspects will become apparent and more readily appreciated from the following description of the embodiments, taken in conjunction with the accompanying drawings in which:

FIG. 3 is a block diagram that illustrates the magnet of FIG. 1 that is moved along the second direction, with focus on the magnet 1 and the first magnetic sensor 2a;

DETAILED DESCRIPTION

Figure 1:
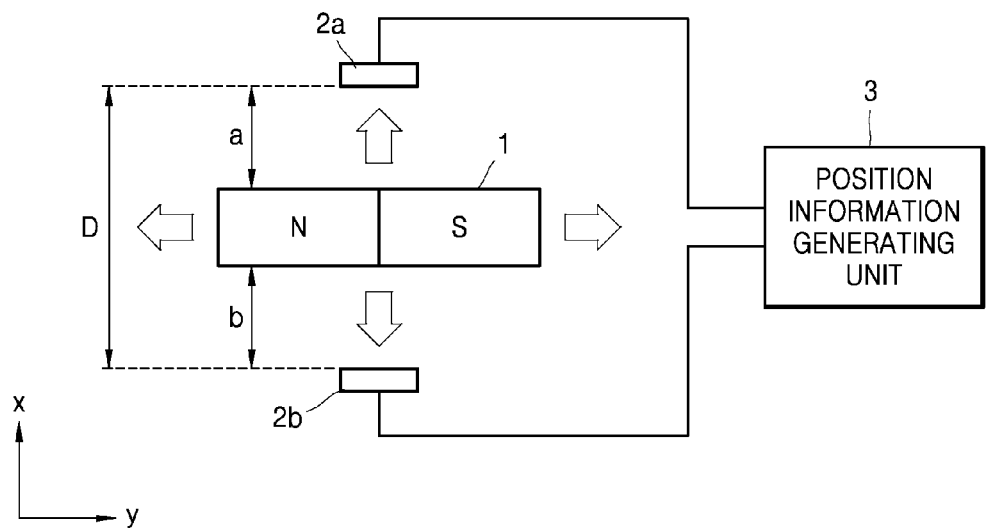
FIG. 1 is a conceptual block diagram illustrating a position detector according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first", "second", etc. may be used herein to describe various elements, these elements should not be limited by these terms. These terms are only used to distinguish one element from another.

FIG. 1 is a conceptual block diagram illustrating a position detector according to an embodiment. Referring to FIG. 1, the position detector includes a magnet 1, first and second magnetic sensors 2a and 2b that detect a detection signal from the magnet 1, and a position information generating unit 3 that generates position information of the magnet 1 based on the detection signal detected by the first and second magnetic sensors 2a and 2b.

Figure 2:
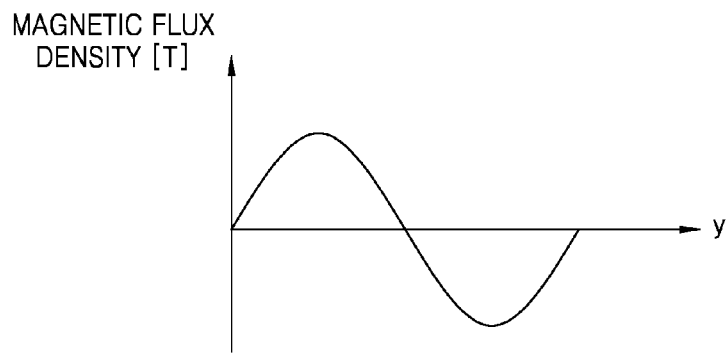
FIG. 2 is a graph showing a magnetic flux density of a magnet in a second direction.

FIG. 2 is a graph showing a magnetic flux density of the magnet 1 in a second direction (y-axis direction). The magnet 1 may have a structure in which an N-pole and an S-pole are arranged in the second direction (y-axis direction). The magnet 1 may have a magnetic flux density as shown in FIG. 2 along the second direction (y-axis direction). The magnet 1 may be moved in a first direction (x-axis direction) and the second direction (y-axis direction) that crosses the first direction (x-axis direction). For example, the second direction (y-axis direction) may be orthogonal to the first direction (x-axis direction), but is not limited thereto.

The first and second magnetic sensors 2a and 2b are spaced apart from each other on two sides along the first direction (x-axis direction) of the magnet 1. The first magnetic sensor 2a is disposed at a first side of the magnet 1, and the second magnetic sensor 2b may be disposed at a second side of the magnet 1. According to movement of the magnet 1 in the first direction (x-axis direction), a distance a between the first magnetic sensor 2a and the magnet 1 along the first direction (x-axis direction) may be varied. According to movement of the magnet 1 along the first direction (x-axis direction), a distance b between the second magnetic sensor 2b and the magnet 1 along the first direction (x-axis direction) may be varied.

A distance D between the first magnetic sensor 2a and the second magnetic sensor 2b along the first direction (x-axis direction) is constant. As a thickness of the magnet 1 along the first direction (x-axis direction) is constant, even when the magnet 1 is moved along the first direction (x-axis direction), a sum (a+b) of the distance a between the first magnetic sensor 2a and the magnet 1 and the distance b between the second magnetic sensor 2b and the magnet 1 may be maintained constant.

The first and second magnetic sensors 2a and 2b may be Hall sensors. The first and second magnetic sensors 2a and 2b may output an electrical signal in proportion to a magnetic flux density that is detected according to movement of the magnet 1 along the second direction (y-axis direction) by using Hall effects.

The first and second magnetic sensors 2a and 2b detect different detection signals according to movement of the magnet 1 along the second direction (y-axis direction). A relationship between the first magnetic sensor 2a and the magnet 1 is substantially the same as that between the second magnetic sensor 2b and the magnet 1, and thus the description will focus on the relationship between the first magnetic sensor 2a and the magnet 1. The basic principle of the first magnetic sensor 2a detecting a position of the magnet 1 in the second direction (y-axis direction) will be briefly described below.

Figure 3:
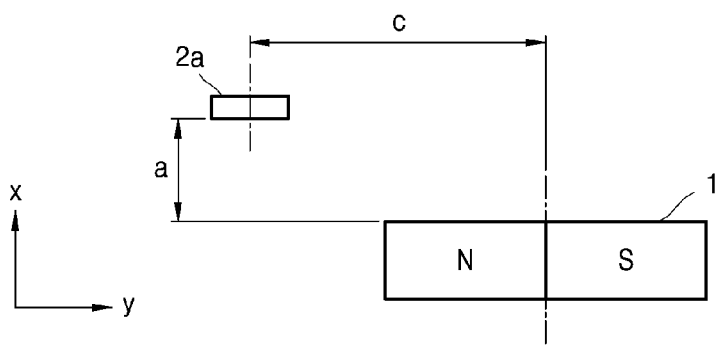

FIG. 3 illustrates the magnet 1 that is moved along the second direction (y-axis direction), with focus on the magnet 1 and the first magnetic sensor 2a. Referring to FIG. 3, the magnet 1 may be moved along the second direction (y-axis direction). As the magnet 1 is moved along the second direction (y-axis direction), a distance c between a center of the magnet 1 and a center of the first magnetic sensor 2a along the second direction (y-axis direction) may be varied. The magnet 1 may have a magnetic flux density that is varied along the second direction (y-axis direction) as shown in FIG. 2. As the magnet 1 is moved along the second direction (y-axis direction) with respect to the first magnetic sensor 2a, a detection signal detected by the first magnetic sensor 2a, for example, a magnetic flux density thereof, is varied.

Figure 4:
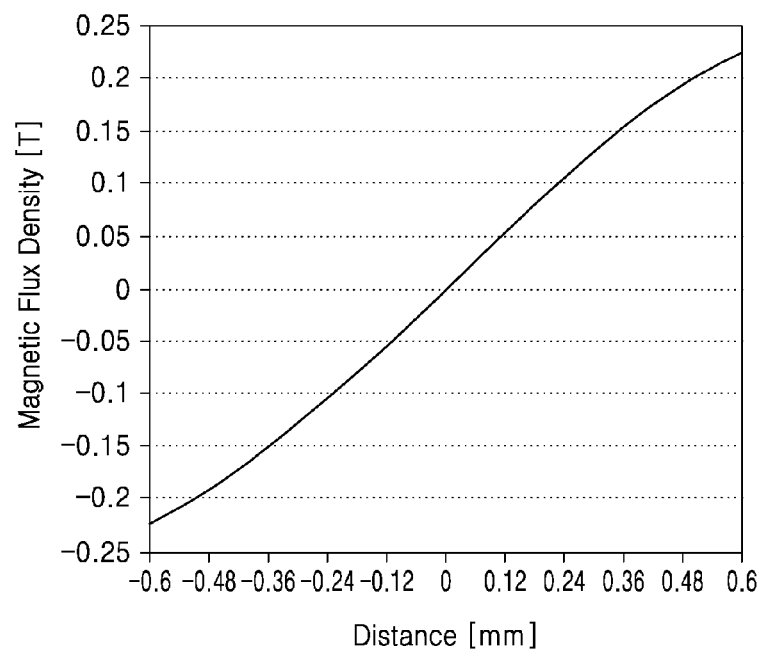
FIG. 4 is a graph showing a magnetic flux density detected as a magnet that is spaced apart from a first magnetic sensor by a predetermined distance, for example, 0.6 mm, in a first direction, and is moved in the second direction.

FIG. 4 is a graph showing a magnetic flux density detected by the first magnetic sensor 2a as the magnet 1 is moved in the second direction (y-axis direction) in a state where the magnet 1 is spaced apart from the first magnetic sensor 2a a predetermined distance, for example, 0.6 mm, in the first direction (x-axis direction). Referring to FIG. 4, a first magnetic flux density detected by the first magnetic sensor 2a has a predetermined value according to the distance c between the center of the magnet 1 and the center of the first magnetic sensor 2a along the second direction (y-axis direction). For example, if the distance c between the center of the magnet 1 and the center of the first magnetic sensor 2a along the second direction (y-axis direction) is 0, a first magnetic flux density detected by the first magnetic sensor 2a is 0 T(tesla), and if the distance c between the center of the magnet 1 and the center of the first magnetic sensor 2a along the second direction (y-axis direction) is 0.12 mm, a first magnetic flux density detected by the first magnetic sensor 2a may be 0.05 T. On the other hand, if the distance c between the center of the magnet 1 and the center of the first magnetic sensor 2a along the second direction (y-axis direction) is −0.12 mm, a first magnetic flux density detected by the first magnetic sensor 2a may be −0.05 T. That is, a first magnetic flux density detected by the first magnetic sensor 2a may be determined according to a position of the magnet 1 along the second direction (y-axis direction). Thus, in principle, the position of the magnet 1 along the second direction (y-axis direction) may be determined based on the first magnetic flux density detected by the first magnetic sensor 2a.

However, the above-provided description of determination of a position of the magnet 1 along the second direction (y-axis direction) assumes that the distance a between the first magnetic sensor 2a and the magnet 1 along the first direction (x-axis direction) is constant. However, as described above with reference to FIG. 1, the magnet 1 is also moved along the first direction (x-axis direction), and thus the distance a between the first magnetic sensor 2a and the magnet 1 along the first direction (x-axis direction) may be varied.

Figure 5:
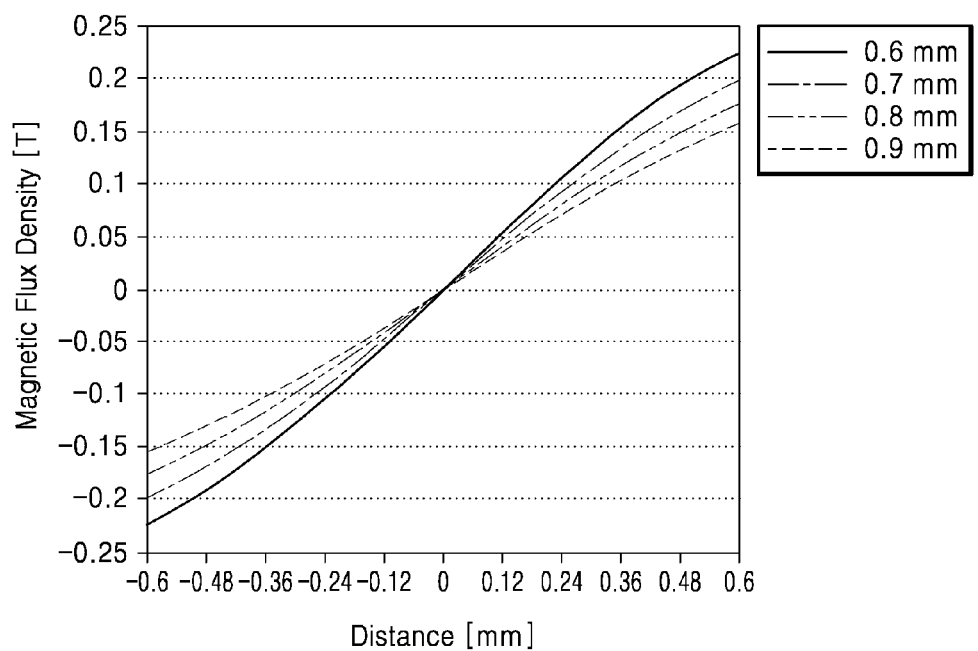
FIG. 5 is a graph showing a first magnetic flux density detected by the first magnetic sensor as the magnet is moved in the second direction, when the distance between the magnet and the first magnet sensor is varied in the first direction.

FIG. 5 is a graph showing a first magnetic flux density detected by the first magnetic sensor 2a as the magnet 1 is moved in the second direction (y-axis direction), when the distance a between the magnet 1 and the first magnet sensor 2a is varied in the first direction (x-axis direction). Referring to FIG. 5, the first magnetic flux density detected by the first magnetic sensor 2a as the magnet 1 is moved along the first direction (x-axis direction) is varied according to the distance a between the magnet 1 and the first magnetic sensor 2a along the first direction (x-axis direction). For example, if the distance a between the magnet 1 and the first magnetic sensor 2a along the first direction (x-axis direction) is 0.6 mm, 0.7 mm, 0.8 mm, and 0.9 mm, and the magnet 1 has moved from the first magnetic sensor 2a by 0.6 mm in the second direction (y-axis direction), the first magnetic flux density detected by the first magnetic sensor 2a is about 0.225 T, about 0.2 T, about 0.175 T, and about 0.16 T, respectively. That is, even if the magnet 1 is disposed at the same position along the second direction (y-axis direction), if the distance a between the magnet 1 and the first magnetic sensor 2a along the first direction (x-axis direction) is varied, the first magnetic flux density detected by the first magnetic sensor 2a is not constant. Accordingly, if a position of the magnet 1 along the first direction (x-axis direction) is determined only by using a magnetic flux density detected by the first magnetic sensor 2a, a significant error may be caused.

Considering this characteristic, according to the current embodiment, the first and second magnetic sensors 2a and 2b that are spaced apart from each other by a predetermined distance D, as illustrated in FIG. 1, are disposed on two sides along the first direction (x-axis direction) of the magnet 1, and a position of the magnet 1 along the second direction (y-axis direction) may be determined based on first and second magnetic flux densities detected by the first and second magnetic sensors 2a and 2b.

Figure 6A:
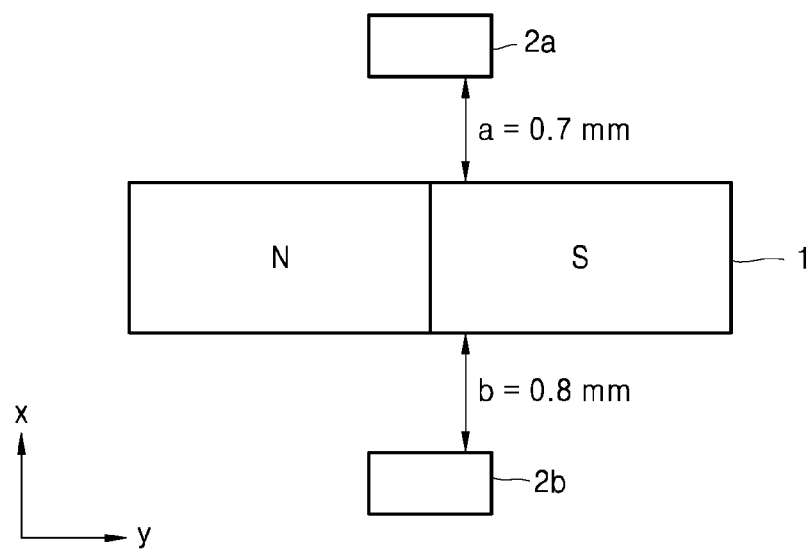
FIGS. 6A and 6B are block diagrams that illustrate a magnet that is moved in a first direction in the position detector of FIG. 1, according to various embodiments.
Figure 6B:
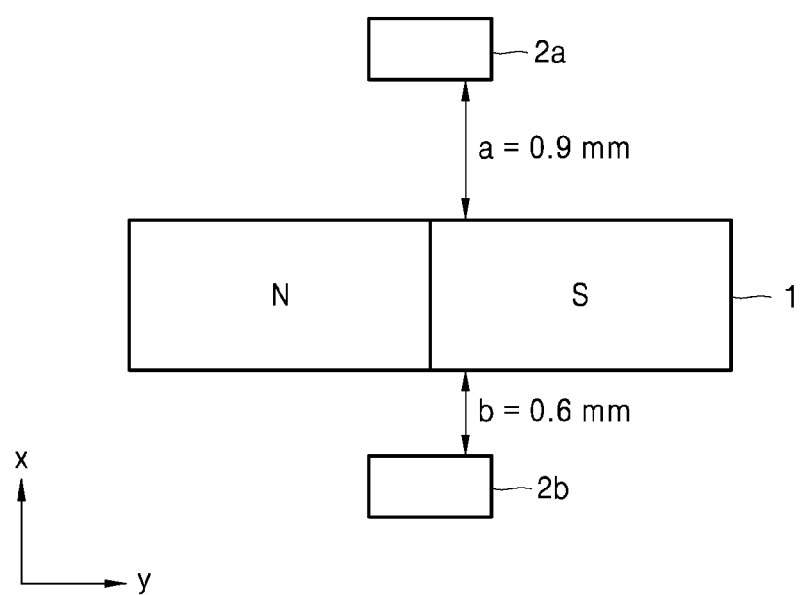

FIGS. 6A and 6B illustrate the magnet 1 that is moved in the first direction (x-axis direction) in the position detector of FIG. 1, according to various embodiments. Referring to FIG. 6A, the magnet 1 is moved in the first direction (x-axis direction) to be located at a position spaced apart from the first magnetic sensor 2a in the first direction (x-axis direction) by 0.7 mm, and at a position apart from the second magnetic sensor 2b by 0.8 mm in the first direction (x-axis direction). Referring to FIG. 6B, the magnet 1 is moved in the first direction (x-axis direction) to be located at a position spaced apart from the first magnetic sensor 2a by 0.9 mm in the first direction (x-axis direction), and at a position spaced apart from the second magnetic sensor 2b by 0.6 mm in the first direction (x-axis direction).

Figure 7A:
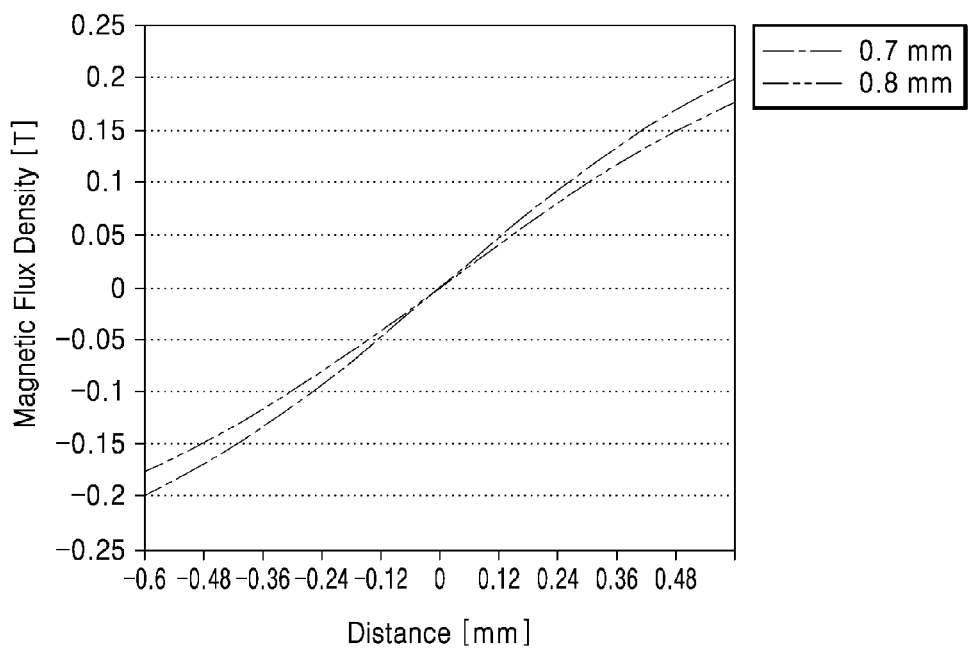
FIG. 7A is a graph showing a magnetic flux density detected by first and second magnetic sensors of FIG. 6A according to a position of a magnet in a second direction.
Figure 7B:
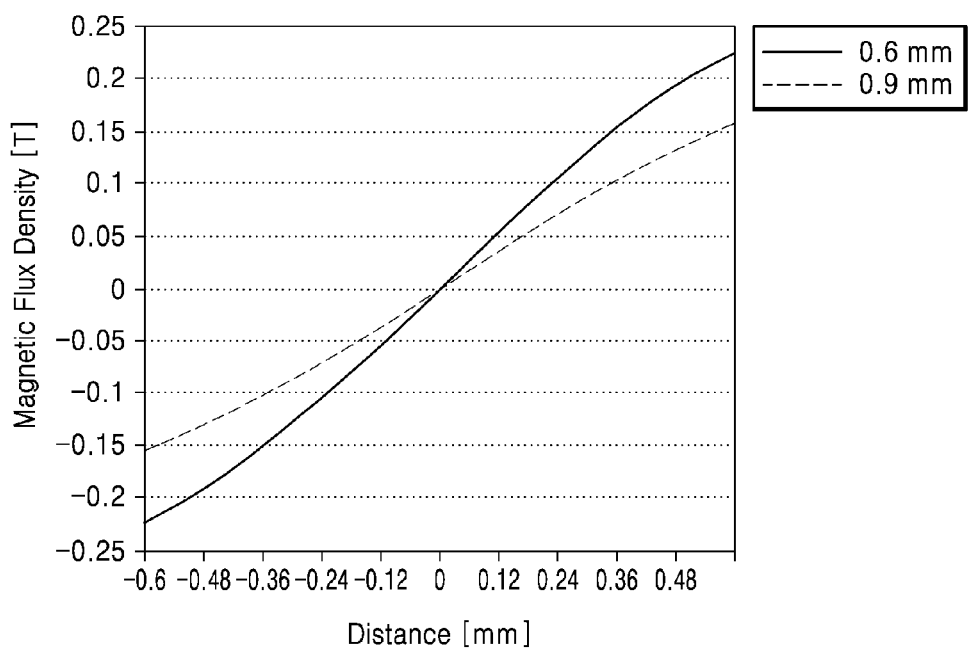
FIG. 7B is a graph showing a magnetic flux density detected by the first and second magnetic sensors of FIG. 6B according to a position of a magnet in a second direction.
Figure 8:
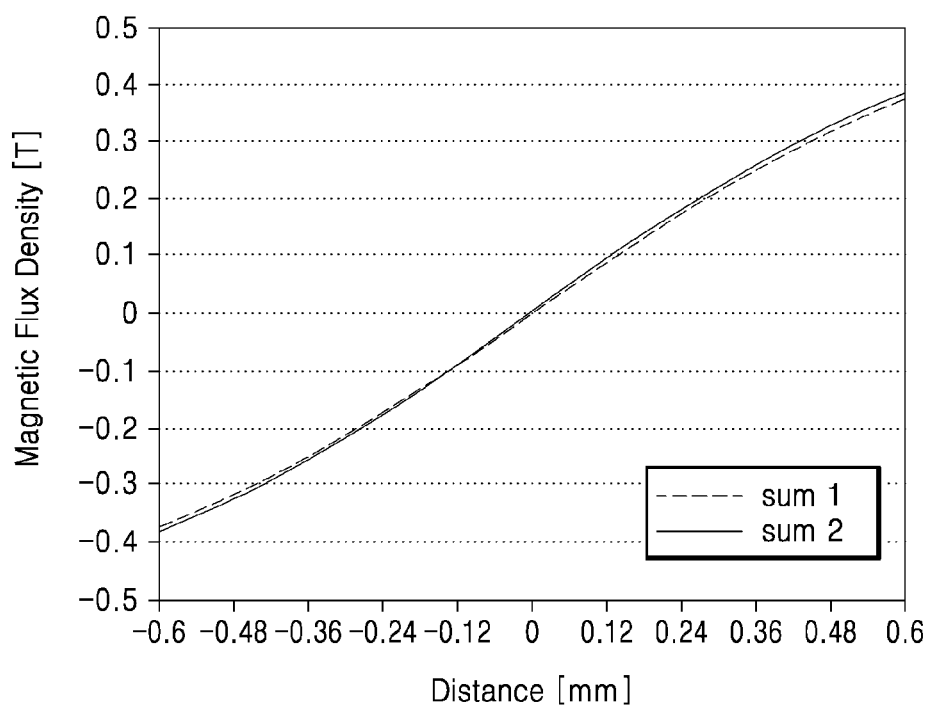
FIG. 8 is a graph showing a third magnetic flux density, which is a sum of the first and second magnetic flux densities detected by the first and second magnetic sensors illustrated in FIGS. 7A and 7B, according to a position of a magnet in the second direction.

FIG. 7A is a graph showing a magnetic flux density detected by first and second magnetic sensors 2a and 2b of FIG. 6A according to a position of the magnet 1 in the second direction (y-axis direction), and FIG. 7B is a graph showing a magnetic flux density detected by the first and second magnetic sensors 2a and 2b of FIG. 6B according to a position of the magnet 1 in the second direction (y-axis direction). FIG. 8 is a graph showing a third magnetic flux density, which is a sum of the first and second magnetic flux densities detected by the first and second magnetic sensors 2a and 2b illustrated in FIGS. 7A and 7B, according to a position of the magnet 1 in the second direction (y-axis direction).

Referring to FIGS. 7A and 7B, according to the position of the magnet 1 along the second direction (y-axis direction), patterns of the first and second magnetic flux densities detected by the first and second magnetic sensors 2a and 2b are varied according to distances between the first and second magnetic sensors 2a and 2b and the magnet 1 along the first direction (x-axis direction). For example, a pattern of the first magnetic flux density detected by the first magnetic sensor 2a when the distance between the first magnetic sensor 2a and the magnet 1 along the first direction (x-axis direction) is 0.7 mm is different from a pattern of the second magnetic flux density detected by the second magnetic sensor 2b when the distance between the second magnetic sensor 2b and the magnet 1 along the first direction (x-axis direction) is 0.8 mm. Also, a pattern of the first magnetic flux density detected by the first magnetic sensor 2a when the distance between the first magnetic sensor 2a and the magnet 1 along the first direction (x-axis direction) is 0.9 mm is different from a pattern of the second magnetic flux density detected by the second magnetic sensor 2b when the distance between the second magnetic sensor 2b and the magnet 1 along the first direction (x-axis direction) is 0.6 mm.

However, referring to FIG. 8, the third magnetic flux density (sum1, sum2), which is a sum of the magnetic flux densities detected by the first and second magnetic sensors 2a and 2b, exhibits substantially the same patterns, regardless of the position of the magnet 1 along the first direction (x-axis direction). The third magnetic flux density (sum 1) is a sum of the first magnetic flux density detected by the first magnetic sensor 2a of FIG. 7A and the second magnetic flux density detected by the second magnetic sensor 2b, and the third magnetic flux density (sum2) is a sum of the first magnetic flux density detected by the first magnetic sensor 2a of FIG. 7B and the second magnetic flux density detected by the second magnetic sensor 2b. The third magnetic flux density (sum1, sum2), which is a sum of the first magnetic flux density and the second magnetic flux density, has a constant value regardless of movement of the magnet 1 in the first direction (x-axis direction). The third magnetic flux density (sum1, sum2) having a constant value according to a position of the magnet 1 in the second direction (y-axis direction) takes into account that an error of the third magnetic flux density detected even when the magnet 1 is moved in the first direction (x-axis direction) at the same position in the second direction (y-axis direction) is less than up to 2.9%.

Accordingly, even when the magnet 1 is located at different positions in the first direction (x-axis direction), as illustrated in FIGS. 6A and 6B, the third magnetic flux density, which is a sum of the magnetic flux densities detected by the first magnetic sensor 2a and the second magnetic sensor 2b, is constant according to the position of the magnet 1 in the second direction (y-axis direction).

Referring to FIG. 1 again, the position information generating unit 3 generates position information of the magnet 1 along the second direction (y-axis direction) based on the first magnetic flux density detected by the first magnetic sensor 2a and the second magnetic flux density detected by the second magnetic sensor 2b. For example, the position information generating unit 3 compares the third magnetic flux density, which is a sum of a first magnetic flux density and a second magnetic flux density, with a reference value set according to the position of the magnet 1 along the second direction (y-axis direction). The reference value may be preset based on the third magnetic flux density according to the position of the magnet 1 in the second direction shown in FIG. 8.

While not illustrated in the drawings, the position information generating unit 3 may include a memory unit that stores a preset reference value according to movement of the magnet 1 in the second direction (y-axis direction) and a position determining unit that determines position information of the magnet 1 along the second direction (y-axis direction) in comparison with the third magnetic flux density.

According to the above-described embodiment, as an example of a detection signal detected by a magnetic sensor, a magnetic flux density is used, but the detection signal is not limited thereto, and an electrical signal or the like may also be used.

Figure 9:
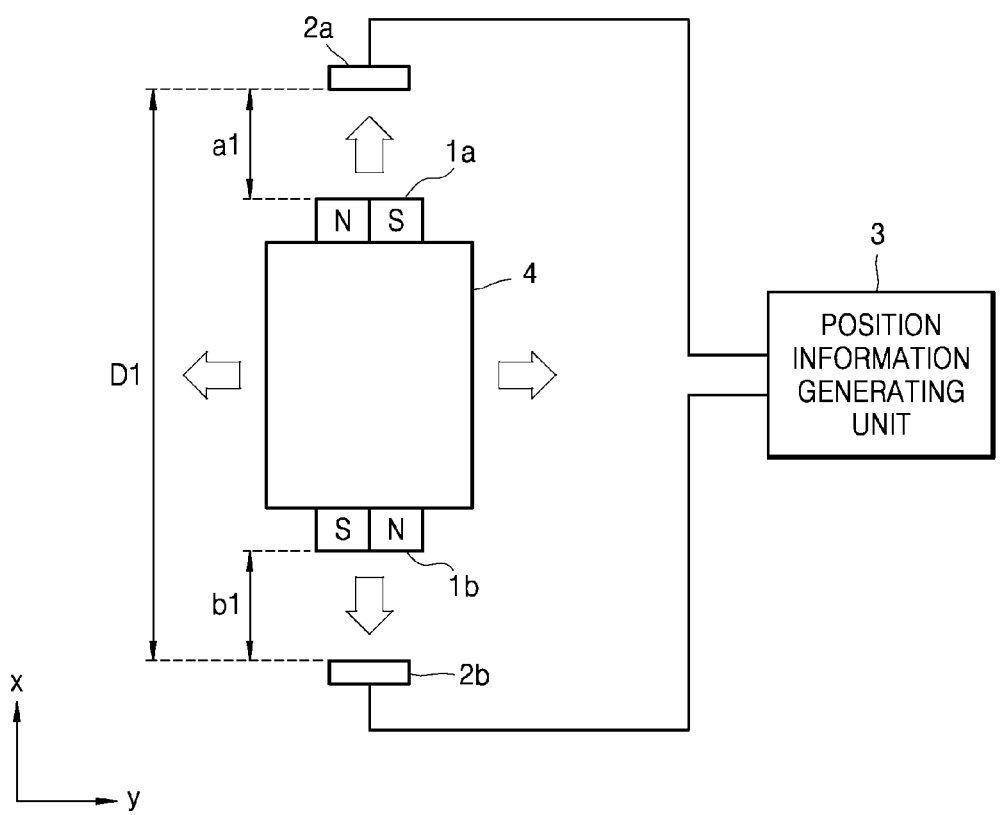
FIG. 9 is a schematic view block diagram illustrating a position detector according to another embodiment.

FIG. 9 is a schematic view block diagram illustrating a position detector according to another embodiment. The position detector of FIG. 9 differs from that of FIG. 1 in that a plurality of magnets, namely, first and second magnets 1a and 1b, installed in a frame 4 are included.

Referring to FIG. 9, the first magnet 1a is disposed at a side along a first direction (x-axis direction) of the frame 4, and the second magnet 1b is disposed at the other side of the frame 4 along the first direction (x-axis direction). A first magnetic sensor 2a is spaced apart from the first magnet 1a in the first direction (x-axis direction), and a second magnetic sensor 2b is spaced apart from the second magnet 1b in the first direction (x-axis direction).

The first magnet 1a and the second magnet 1b are fixed to the frame 4, and may be moved in the first direction (x-axis direction) and the second direction (y-axis direction). The first and second magnets 1a and 1b may have a structure in which an N-pole and an S-pole are arranged in the first direction (x-axis direction). The first magnet 1a and the second magnet 1b may all have the same magnetic flux density as that of FIG. 2 but are not limited thereto, and may also have different magnetic flux densities. Also, the first and second magnets 1a and 1b may have different magnetic flux densities from that of FIG. 2.

A distance a1 between the first magnetic sensor 2a and the first magnet 1a is varied according to movement of the first magnet 1a in the first direction (x-axis direction). A distance b1 between the second magnetic sensor 2b and the second magnet 1b is varied according to movement of the second magnet 1b in the first direction (x-axis direction). A distance D1 between the first magnetic sensor 2a and the second magnetic sensor 2b in the first direction (x-axis direction) may be maintained constant. Accordingly, even when the first magnet 1a and the second magnet 1b are moved in the first direction (x-axis direction), a sum (a1+b1) of the distance a1 between the first magnetic sensor 2a and the first magnet 1a and the distance b1 between the second magnetic sensor 2b and the second magnet 1b may be maintained constant.

As has been described above with reference to FIG. 1, although patterns of the first and second magnetic flux densities detected by the first and second magnetic sensors 2a and 2b are varied according to movement of the first and second magnets 1a and 1b in the first direction (x-axis direction), a pattern of a third magnetic flux density, which is a sum of the first and second magnetic flux densities, is constant. Accordingly, the position information generating unit 3 may generate or determine position information of the first and second magnets 1a and 1b in the second direction (y-axis direction) based on the third magnetic flux density, which is a sum of the first and second magnetic flux densities.

Figure 10:
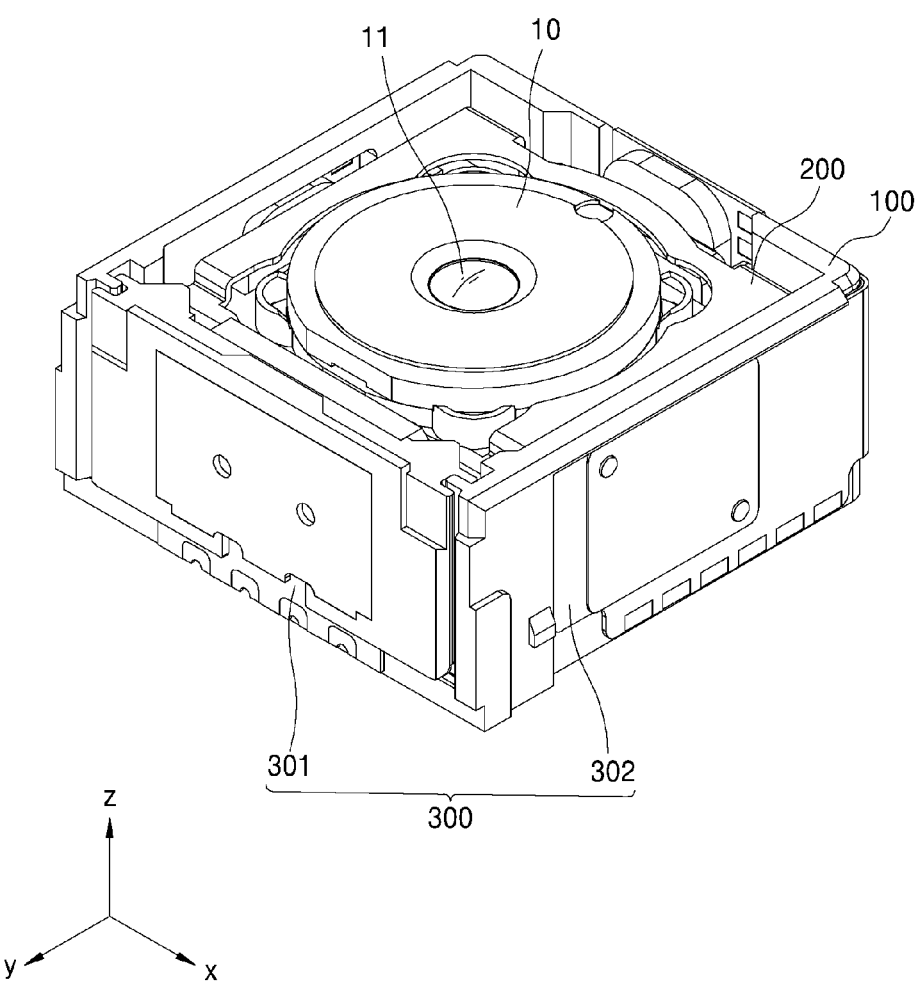
FIG. 10 is a perspective assembly view of a camera module according to an embodiment.
Figure 11:
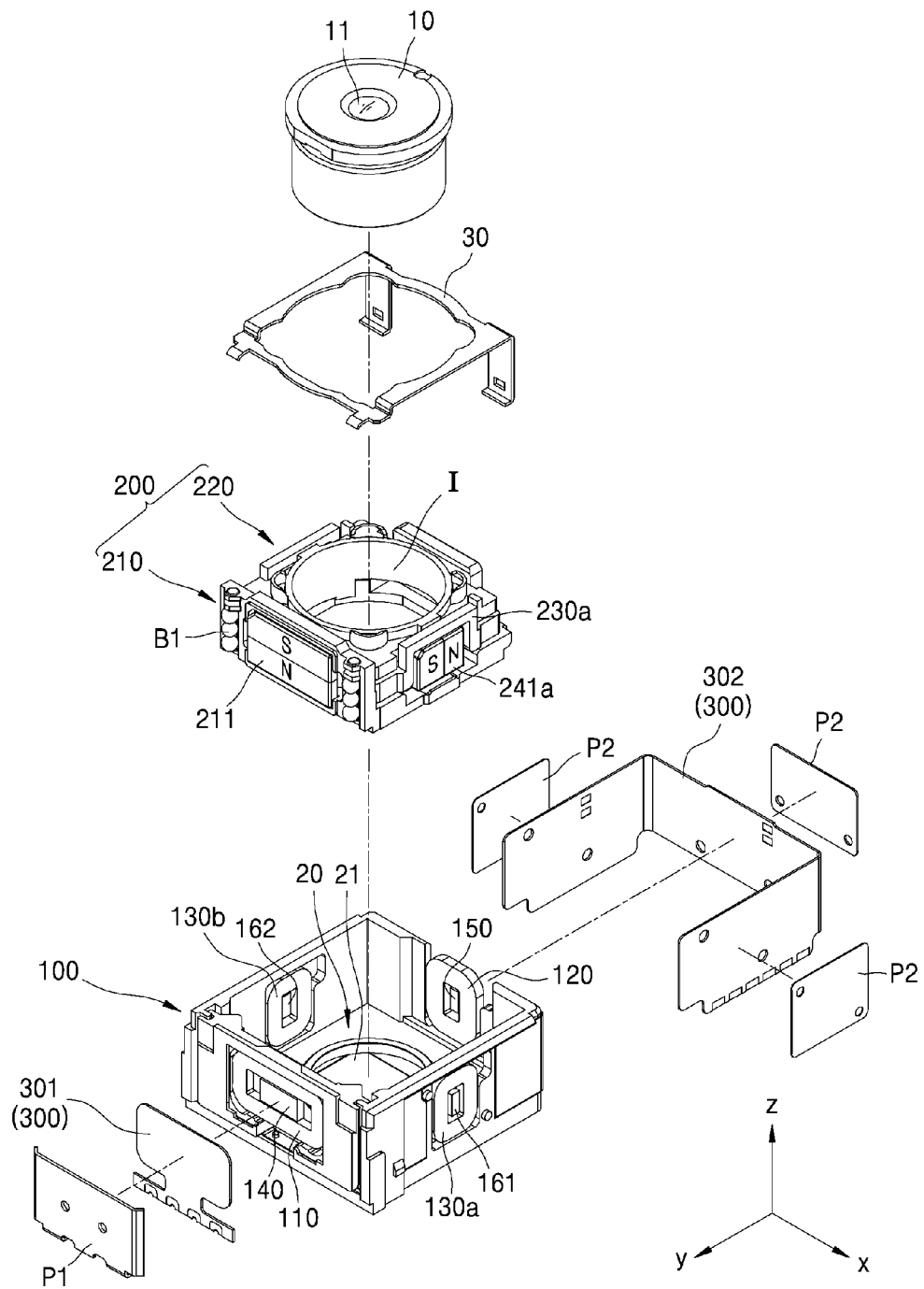
FIG. 11 is an exploded perspective view illustrating the camera module of FIG. 10 according to an embodiment.
Figure 12:
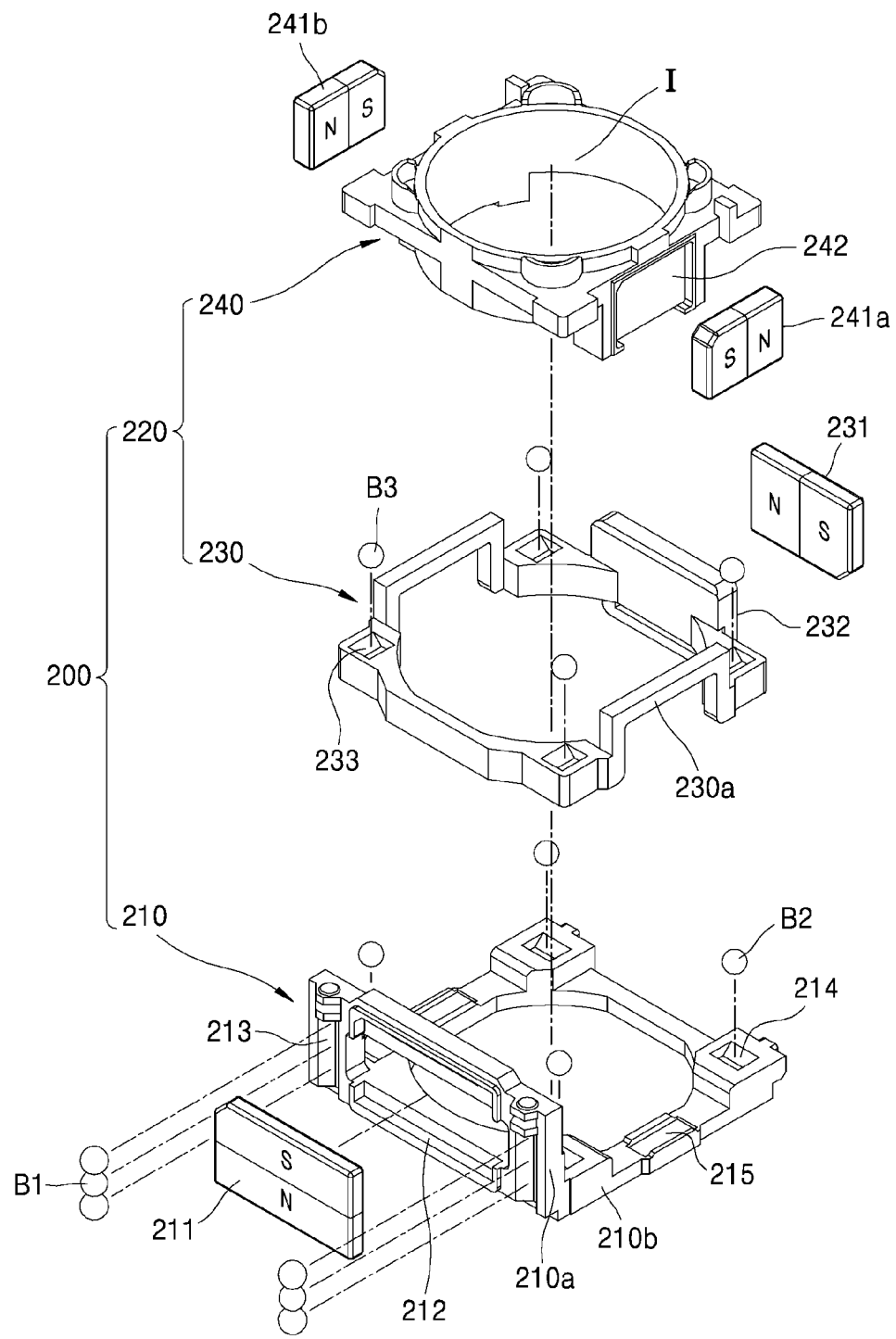
FIG. 12 is an exploded perspective view of a moving frame of FIG. 11 according to an embodiment.
Figure 13:
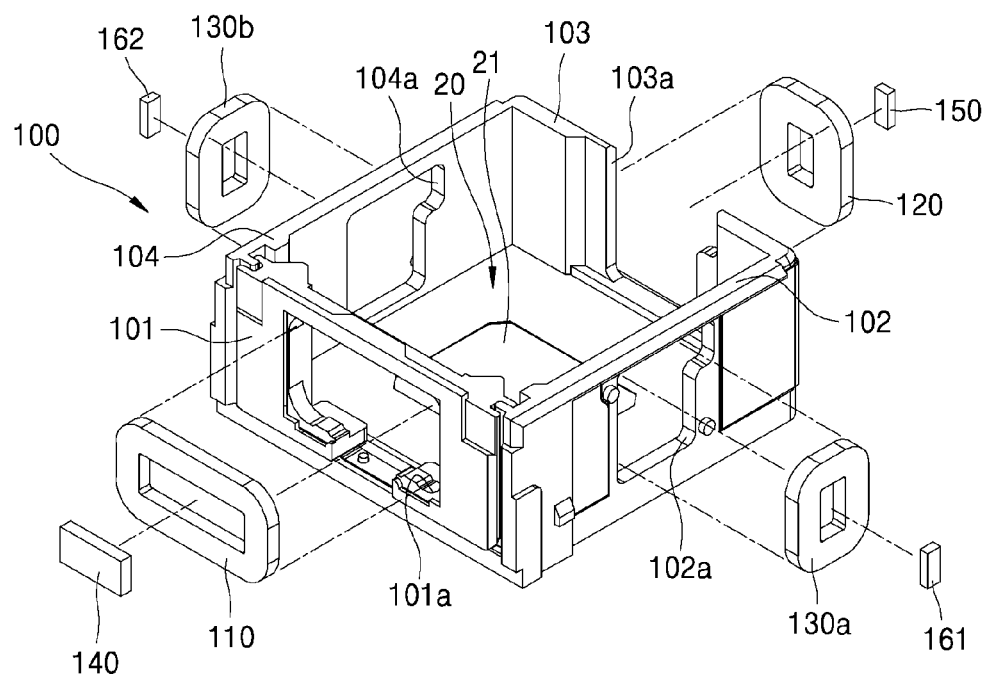
FIG. 13 is an exploded perspective view of a fixed frame of FIG. 11 according to an embodiment.

FIG. 10 is a perspective assembly view of a camera module according to an embodiment. FIG. 11 is an exploded perspective view illustrating the camera module of FIG. 10 according to an embodiment. FIG. 12 is an exploded perspective view of a moving frame 200 of FIG. 11 according to an embodiment. FIG. 13 is an exploded perspective view of a fixed frame 100 of FIG. 11 according to an embodiment.

Referring to FIG. 10, the camera module may include a lens barrel 10 including at least one lens group 11, the moving frame 200 that mounts (or includes) the lens barrel 10 to move the lens barrel 10 in an optical axis direction (z-axis direction) and in first and second directions (x-axis and y-axis directions) that are perpendicular to the optical axis (z-axis), the fixed frame 100 that movably supports the moving frame 200, and a printed circuit board 300 that supplies a current to move the moving frame 200.

The moving frame 200 may be driven along the optical axis direction (z-axis direction), the first direction (x-axis direction), and the second direction (y-axis direction). Accordingly, an Auto Focus function of automatically adjusting a focus on an image sensor 21 (see FIG. 11) and an optical image stabilizer (OIS) function of preventing a decrease in image quality due to vibration such as hand shake may be performed. The moving frame 200 performs the Auto Focus function by moving the lens barrel 10 along the optical axis direction (z-axis direction), and by moving the lens barrel 10 two-dimensionally along a direction (x-axis direction, y-axis direction) that is perpendicular to the optical axis (z-axis), the OIS function may be performed.

The printed circuit board 300 provides the fixed frame 100 with a current for three-axis driving of the moving frame 200. The printed circuit board 300 may drive the moving frame 200 along three axes by providing a current to the fixed frame 100. The printed circuit board 300 may be a flexible printed circuit board.

If the printed circuit board 300 provides a current to the moving frame 200 and not the fixed frame 100, the printed circuit board 300 which supplies a current to the moving frame 200 may be folded or unfolded while the moving frame 200 is moved. Accordingly, the printed circuit board 300 may be damaged or a tension may be varied, and the variation in the tension may hinder accurate movement of the moving frame 200.

However, according to the current embodiment, the printed circuit board 300 provides a current not to the moving frame 200 but to the fixed frame 100, thereby preventing folding or unfolding of the printed circuit board 300 due to movement of the moving frame 200. As there is no variation in tension applied to the printed circuit board 300, the moving frame 200 may be accurately moved.

Referring to FIGS. 11 through 13, a base 20 is disposed under the fixed frame 100, and the image sensor 21 may be included in a center portion thereof. The lens barrel 10 may be spaced apart from the image sensor 21 in the optical axis direction (z-axis direction).

The fixed frame 100 is fixed to the base 20. That the fixed frame 100 is fixed to the base 20 indicates that relative positions of the fixed frame 100 and the base 20 do not vary, and as illustrated in FIG. 11, not only a case where the fixed frame 100 is directly fixed to the base 20 but also a case where the fixed frame 100 is indirectly fixed to the base 20 via another member is included.

The fixed frame 100 movably supports the moving frame 200, and provides a driving force to the moving frame 200 in the optical axis direction (z-axis direction) and a first direction (x-axis direction) and a second direction (y-axis direction) that are perpendicular to the optical axis direction.

The fixed frame 100 may include four sidewalls, namely, first, second, third, and fourth sidewalls 101, 102, 103, and 104, that surround side portions of the moving frame 200. The four sidewalls 101, 102, 103, and 104 of the fixed frame 100 respectively include first, second, and third driving coils 110, 120, 130a, and 130b. For example, the first driving coil 110 for moving a first moving frame 210 in the optical axis direction (z-axis direction) is included in an opening 101a of the first sidewall 101, and a second driving coil 120 for moving a second moving frame 220 in the first direction (x-axis direction) is included in an opening 103a of the third sidewall 103, and a pair of third driving coils 130a and 130b for moving the second moving frame 220 in the second direction (y-axis direction) are included in openings 102a and 104a of the second and fourth sidewalls 102 and 104. By including the pair of the third driving coils 130a and 130b in the second and fourth sidewalls 102 and 104, the second moving frame 220 may be stably moved in the second direction (Y-axis direction). The first, second, and third driving coils 110, 120, 130a, and 130b receive a current from the printed circuit board 300 to move the first and second moving frames 210 and 220. The first and second moving frames 210 and 220 are disposed inside the fixed frame 100.

The first moving frame 210 is moved in the fixed frame 100 in the optical axis direction (z-axis direction). A first magnet 211 disposed to correspond to the first driving coil 110 may be disposed in the first moving frame 210. The first magnet 211 may have a structure in which an N-pole and an S-pole are arranged along the optical axis direction (z-axis direction). The first magnet 211 may be a member that generates a magnetic force without an additional power supply, such as a permanent magnet.

The first moving frame 210 may be movably supported by the fixed frame 100 in the optical axis direction (z-axis direction). A plurality of ball bearings B1 may be arranged between the first moving frame 210 and the fixed frame 100. A guide groove 213 that guides the ball bearings B1 to be moved along the optical axis direction (z-axis direction) may be formed in at least one of the first moving frame 210 and the fixed frame 100. The guide groove 213 extends in the optical axis direction (z-axis direction), and may be used to remove a force applied to the ball bearings B1 in another direction different from the optical axis direction (z-axis direction). Accordingly, the first moving frame 210 may be moved accurately in the optical axis direction (z-axis direction).

The first moving frame 210 may have an L-shaped cross-section. The first moving frame 210 includes a first portion 210a that is parallel to the optical axis direction (z-axis direction) and a second portion 210b that is perpendicular to the optical axis direction (z-axis direction). The first magnet 211 and a groove 212 into which the first magnet 211 is to be inserted may be formed in the first portion 210a. The second portion 210b movably supports the second moving frame 220 in a direction that is perpendicular to the optical axis. In the second portion 210b, a yoke 215 for preventing detachment of the second moving frame 220 may be included.

The second moving frame 220 is moved in a direction that is perpendicular to the optical axis in the fixed frame 100. For example, the second moving frame 220 may be movably supported in the first moving frame 210 in a direction that is perpendicular to the optical axis. The second moving frame 220 may include a mounting portion I in which the lens barrel 10 may be mounted and second and third magnets 231, 241a, and 241b disposed around a circumference of the mounting portion Ito respectively correspond to the second and third driving coils 120, 130a, and 130b. The second magnet 231 may have a structure in which an N-pole and an S-pole are arranged in the first direction (x-axis direction) that is perpendicular to the optical axis. The third magnets 241a and 241b may have a structure in which an N-pole and an S-pole are arranged in the second direction (y-axis direction) that is perpendicular to the optical axis. Arrangement directions of the N-pole and the S-pole of the second and third magnets 231, 241a, and 241b may be perpendicular to the arrangement direction of the N-pole and the S-pole of the first magnet 211. According to this arrangement, the first, second, and third magnets 211, 231, 241a, and 241b may be disposed at a side of the moving frame 200, and may move the moving frame 200 along three axes. The second and third magnets 231,

241a, and 241b may each be a member that generates a magnetic force without an additional power supply, such as a permanent magnet.

The second moving frame 220 may include a first sub-moving frame 230 and a second sub-moving frame 240. The first sub-moving frame 230 may be movably supported by the first moving frame 210 in the first direction (x-axis direction). A ball bearing B2 may be disposed between the first sub-moving frame 230 and the first moving frame 210. A guide groove 214 that guides the ball bearing B2 to move in the first direction (x-direction) may be formed in at least one of the first sub-moving frame 230 and the first moving frame 210. The guide groove 214 extends in the first direction (x-axis direction), and may remove a force that is applied to the ball bearings B1 in another direction different from the first direction (x-direction). Accordingly, the first sub-moving frame 230 may be accurately moved along the first direction (x-direction). A groove portion 232 into which the second magnet 231 is inserted is formed in the first sub-moving frame 230, and a detour portion 230a that prevents interference of the first sub-moving frame 230 with the third magnets 241a and 241b may be formed. When the third magnets 241a and 241b are moved in the second direction (Y-axis direction), the detour portion 230a may be spaced apart from the third magnets 241a and 241b to not disturb movement of the third magnets 241a and 241b. For example, if the third magnets 241a and 241b are set to move about 0.2 mm in the second direction (y-axis direction), a distance between the detour portion 230a and the third magnets 241a and 241b may be about 0.4 mm.

The second sub-moving frame 240 may be movably supported by the first sub-moving frame 230 in the second direction (y-axis direction). A ball bearing B3 may be disposed between the second sub-moving frame 240 and the first sub-moving frame 230. A guide groove 233 that guides the ball bearing B3 to move in the second direction (y-axis direction) may be formed in each of the second sub-moving frame 240 and the first sub-moving frame 230. The guide groove 233 extends in the second direction (y-axis direction), and may remove a force that is applied to the ball bearings B1 in another direction different from the second direction (y-axis direction). Accordingly, the second sub-moving frame 240 may be accurately moved in the second direction (y-axis direction). A groove 242 into which the third magnets 241a and 241b are to be inserted may be formed in the second sub-moving frame 240. A cover 30 may be formed on the second sub-moving frame 240.

The fixed frame 100 is electrically connected to the printed circuit board 300. Accordingly, the first, second, and third driving coils 110, 120, 130a, and 130b included in the fixed frame 100 receive a current to move the first and second moving frames 210 and 220.

When a current is supplied to the first, second, and third driving coils 110, 120, 130a, 130b, the first, second, and third magnets 211, 231, 241a, 241b corresponding thereto move in a predetermined direction according to the Fleming left hand rule. When a current is supplied to the first driving coil 110, the first magnet 211 is moved in the optical axis direction (z-axis direction). The first magnet 211 may be moved in a positive direction or a negative direction of the optical axis direction (z-axis direction) according to a direction that the current is supplied to the first driving coil 110. When a current is supplied to the second driving coil 120, the second magnet 231 is moved in a positive direction or a negative direction of the first direction (x-axis direction) that is perpendicular to the optical axis. When a current is supplied to the third driving coils 130a and 130b, the third magnets 241a and 241b are also moved in a positive direction or a negative direction of the second direction (y-axis direction) that is perpendicular to the optical axis.

The printed circuit board 300 is electrically connected to the fixed frame 100. For example, a first printed circuit board 301 is connected to the first driving coil 110, and a second printed circuit board 302 is connected to the second and third driving coils 120, 130a, and 130b. Plates P1 and P2 for connecting the printed circuit board 300 to driving coils may be disposed outside the printed circuit board 300. A first plate P1 may be disposed on the outside of the first printed circuit board 301, and a second plate P2 may be disposed on the outside of the second printed circuit board 302. The first and second plates P1 and P2 may be formed of various materials such as stainless steel.

As described above, by disposing the first, second, and third magnets 211, 231, 241a, and 241b, which do not need to be electrically connected, to the moving frame 200 that moves along three axes and disposing the first, second, and third driving coils 110, 120, 130a, and 130b, which need to be electrically connected, to the fixed frame 100 that is fixed to the base 20, the printed circuit board 300 that is electrically connected to the fixed frame 100 does not interfere with movement of the moving frame 200. Accordingly, the moving frame 200 may be moved accurately.

First, second, and third sensors 140, 150, 161, and 162 that sense movement of the moving frame 200 may be included in the four sidewalls, namely, the first, second, third, and fourth sidewalls 101, 102, 103, and 104, of the fixed frame 100. For example, the first sensor 140 is included in the first sidewall 101 to sense movement of the first magnet 211 in an optical direction (z-axis direction), and a second sensor 150 is included in the third sidewall 103 to sense movement of the second magnet 231 in the first direction (x-axis direction), and a pair of third sensors 161 and 162 may be respectively included in the second and fourth sidewalls 102 and 104 to sense movement of the third magnets 241a and 241b in the second direction (y-axis direction).

The first, second, and third sensors 140, 150, 161, and 162 may be magnetic sensors. The first, second, and third sensors 140, 150, 161, and 162 may output an electrical signal in proportion to a magnetic field of a magnet based on the Hall effect, thereby sensing movement of the first, second, and third magnets 211, 231, 241a, and 241b and the moving frame 200 in which the first, second, and third magnets 211, 231, 241a, and 241b are installed.

The first, second, and third sensors 140, 150, 161, and 162 may detect positions of the first, second, and third magnets 211, 231, 241a, and 241b used in moving the moving frame 200. Accordingly, there is no need to install an additional magnet for position detection, and thus, a structure of the camera module may be simplified.

The first sensor 140 may determine position movement of the first magnet 211 in the optical axis direction (z-axis direction). The first moving frame 210 in which the first magnet 211 is provided moves only in the optical axis direction (z-axis direction) with respect to the fixed frame 100 in which the first sensor 140 is included, and accordingly, a distance between the first magnet 211 and the first sensor 140 in the second direction (y-axis direction) is constant. A position movement of the first magnet 211 in the optical axis direction (z-axis direction) may be determined based on a magnetic flux density detected by the first sensor 140 that is spaced apart from the first magnet 211 in the second direction (y-axis direction) by a constant distance. Accordingly, the first sensor 140 may determine position movement of the first moving frame 210 including the first magnet 211 in the optical axis direction (z-axis direction).

The second sensor 150 may determine position movement of the second magnet 231 in the first direction (x-axis direction). The first sub-moving frame 230 including the second magnet 231 moves in the first direction (x-axis direction) with respect to the first moving frame 210 by the guide groove 214. The first sub-moving frame 230 is not able to move in the second direction (y-axis direction) with respect to the first moving frame 210, and thus, a distance between the second sensor 150 installed in the fixed frame 100 and the second magnet 231 included in the first sub-moving frame 230 in the second direction (y-axis direction) is constant. A position movement of the second magnet 231 in the first direction (x-axis direction) may be determined based on a magnetic flux density detected by the second sensor 150, which is spaced apart from the second magnet 231 by a constant distance in the second direction (y-axis direction). Accordingly, the second sensor 150 may determine position movement of the first sub-moving frame 230 including the second magnet 231.

The pair of third sensors 161 and 162 may determine position movement of the pair of third magnets 241a and 241b in the second direction (y-axis direction). The second sub-moving frame 240 including the pair of third magnets 241a and 241b is moved in the second direction (y-axis direction) with respect to the first sub-moving frame 230 by the guide groove 233. The second sub-moving frame 240 is not able to move along the first direction (x-axis direction) with respect to the first sub-moving frame 230, but the first sub-moving frame 230 that movably supports the second sub-moving frame 240 may move in the first direction (x-axis direction) as described above. Accordingly, when the first sub-moving frame 230 is moved in the first direction (x-axis direction), the second sub-moving frame 240 that is supported by the first sub-moving frame 230 is moved in the first direction, resulting in the pair of the third magnets 241a and 241b to move in the first direction (x-axis direction). Thus, a distance between the third magnets 241a and 241b and the third sensors 161 and 162 is varied.

Figure 14:
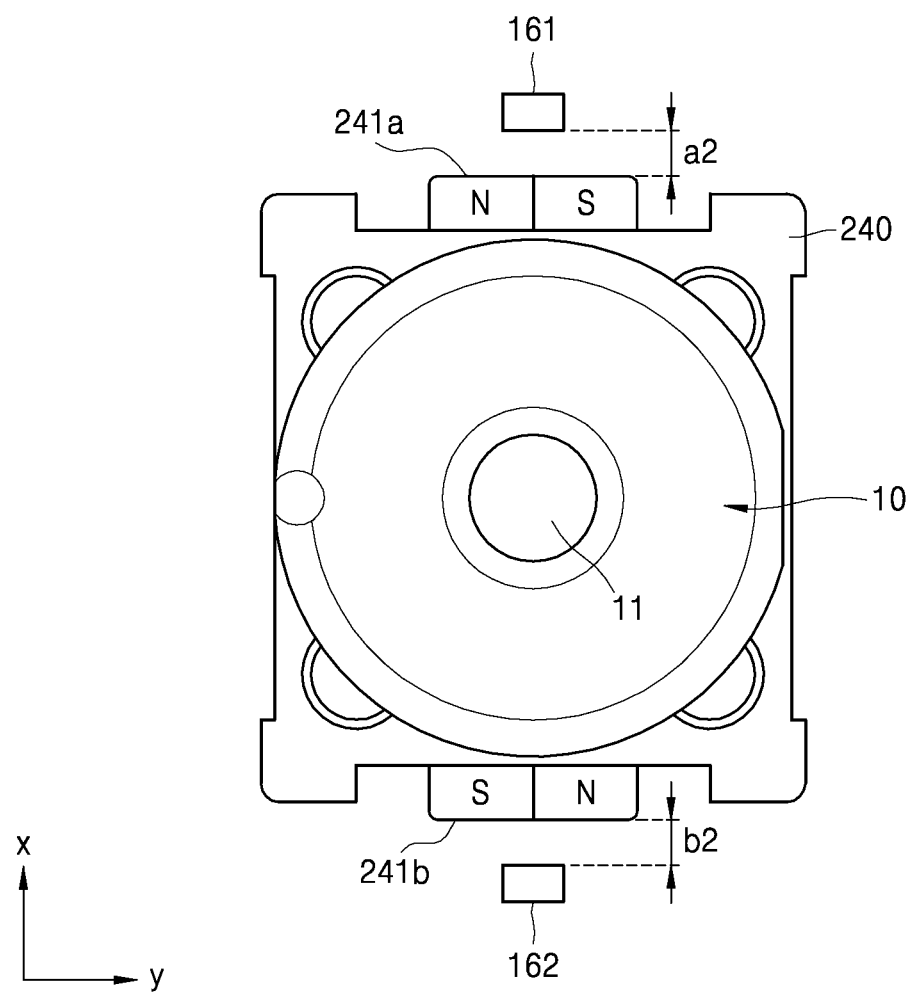
FIG. 14 is a plan view of the camera module of FIG. 11, with focus on a second sub-moving frame of FIG. 11.

FIG. 14 is a plan view of the camera module of FIG. 11, with focus on the second sub-moving frame 240 of FIG. 11. Referring to FIG. 14, the second sub-moving frame 240 includes the lens barrel 10, and is moved in the first direction (x-axis direction) and the second direction (y-axis direction). The second sub-moving frame 240 includes the pair of third magnets 241a and 241b disposed on two sides in the first direction (x-axis direction).

The fixed frame 100 includes the pair of third sensors 161 and 162 that are spaced apart from each other in the first direction (x-axis direction) to correspond to the pair of the third magnets 241a and 241b, for example, magnetic sensors. The third magnets 241a and 241b are spaced apart from each other by a predetermined distance. When a distance between the third magnet 241a and the third sensor 161 in the first direction (x-axis direction) is a2, and a distance between the third magnet 241b and the third sensor 162 in the first direction (x-axis direction) is b2, the distances a2 and b2 are varied according to movement of the second sub-moving frame 240 in the first direction (x-axis direction) but a sum (a2+b2) is constant.

As the second sub-moving frame 240, including the pair of third magnets 241a and 241b, is moved in the first direction (x-axis direction), the distances a2 and b2 are varied, and patterns of a first magnetic flux density and a second magnetic flux density that are individually detected by the pair of third sensors 161 and 162 are varied. However, as has been described above with reference to FIG. 1, a third magnetic flux density, which is a sum of the first and second magnetic flux densities, is constant even when the pair of third magnets 241a and 241b are moved in the first direction (x-axis direction).

Accordingly, the position information generating unit (not shown) may compare the third magnetic flux density, which is the sum of the first and second magnetic flux densities detected by the pair of third sensors 241a and 241b, with a predetermined reference value, thereby generating or determining position information of the second sub-moving frame 240 in the second direction (y-axis direction).

While a magnetic flux density is used as an example of a detection signal detected by a magnetic sensor in the current embodiment, the detection signal is not limited thereto, and an electrical signal or the like may also be used.

Table 1 below shows results of position movement of the moving frame 200 of the camera module of FIG. 11 in a positive direction or a negative direction of the second direction (y-axis direction). A current was supplied to the third driving coils 130a and 130b to move the third magnets 241a and 241b in a positive direction of the second direction (y-axis direction) nine times and in a negative direction of the second direction (y-axis direction) nine times when the moving frame 200 was at a reference position (Offset=0 um), when the moving frame 200 was spaced apart from the reference position by a distance of +100 um in the first direction (x-axis direction) (Offset=+100 um), and when the moving frame 200 was spaced apart from the reference position by a distance of −100 um in the first direction (x-axis direction) (Offset=−100 um), respectively. When moving the third magnets 241a and 241b in the second direction (y-axis direction), position information of the third magnets 241a and 241b generated based on the sum of detection signals detected by the pair of third sensors 161 and 162 was used.

TABLE 1

| Frequency | Moving distance [um] of moving frame in the second direction when Offset = 0 um | | Moving distance [um] of moving frame in the second direction when Offset = +100 um | | Moving distance [um] of moving frame in the second direction when Offset = −100 um | |
|---|---|---|---|---|---|---|
| | positive direction | negative direction | positive direction | negative direction | positive direction | negative direction |
| 1 | 10 | 9 | 10 | 10 | 9 | 10 |
| 2 | 9 | 10 | 10 | 11 | 9 | 9 |
| 3 | 9 | 9 | 11 | 11 | 10 | 9 |
| 4 | 10 | 9 | 11 | 10 | 8 | 9 |
| 5 | 9 | 10 | 11 | 11 | 9 | 10 |
| 6 | 11 | 9 | 10 | 10 | 9 | 9 |
| 7 | 11 | 9 | 10 | 10 | 10 | 8 |
| 8 | 10 | 8 | 11 | 11 | 10 | 9 |
| 9 | 9 | 8 | 9 | 10 | 10 | 9 |
| Average | 9.8 | 9.0 | 10.3 | 10.4 | 9.3 | 9.1 |

Referring to Table 1, even when a position of the moving frame 200 is varied in the first direction (x-axis direction), if a predetermined current was applied to the third driving coils 130a and 130b, the moving frame 200 was moved uniformly within a range of about 8 to 11 um, which is a predetermined range in the second direction (y-axis direction). An average distance is about 9.0 um to about 10.4 um.

The uniform position movement of the moving frame 200 in the second direction (y-axis direction), as shown in Table 1, assumes accurate position detection of the moving frame 200 in the second direction (y-axis direction). Accordingly, based on the uniform result of the moving frame 200 in the second direction (y-axis direction) in a predetermined range, it may be indirectly confirmed that positions of the third magnets 241a and 241b may be accurately detected based on the sum of detection signals detected by the pair of third sensors 161 and 162.

In the above-described embodiment, the first sub-moving frame 230 is moved in the first direction (x-axis direction), and the second sub-moving frame 240 is moved in the second direction (y-axis direction), but the embodiments of the present invention are not limited thereto. For example, in contrast to the above-described embodiment, the first sub-moving frame 230 is moved in the second direction (y-axis direction), and the second sub-moving frame 240 is moved in the first direction (x-axis direction). Also, while a voice coil motor (VCM) method, in which an electromagnetic force generated between a coil and a magnet is used to drive the moving frame 200, is used in the above-described embodiment, other methods for driving the moving frame 200, for example, an ultrasonic wave motor method using a piezoelectric element or a method of driving the moving frame 200 by applying a current to a shape memory alloy may also be used.

As described above, according to the one or more of the above embodiments, a pair of magnetic sensors that are spaced apart from each other by a predetermined distance may be disposed, and a position of a magnet, which is driven along at least two axes, may be accurately determined based on detection signals detected from the magnetic sensors.

In addition, as a magnet that is used in driving a lens barrel is used in position detection, another independent sensor may not have to be used additionally, thereby increasing a degree of freedom in terms of design of the camera module and reducing manufacturing costs thereof.

For the purposes of promoting an understanding of the principles of the invention, reference has been made to exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a", "an", and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A camera module comprising:
   a lens barrel including at least one lens group;
   a moving frame that mounts the lens barrel, is movable in a first direction and in a second direction that crosses the first direction, and includes first and second magnets that are disposed on two sides in the first direction;
   a fixed frame that movably supports the moving frame and includes first and second magnetic sensors that are spaced apart from each other in the first direction to respectively correspond to the first and second magnets; and
   a position information generating unit that generates position information of the first and second magnets in the second direction based on a first detection signal detected by the first magnetic sensor and a second detection signal detected by the second magnetic sensor.

2. The camera module of claim 1, wherein the position information generating unit generates position information of the moving frame in the second direction based on a third detection signal, which is a sum of the first detection signal and the second detection signal.

3. The camera module of claim 1, wherein sum of a distance between the first magnet and the first magnetic sensor in the first direction and a distance between the second magnet and the second magnetic sensor in the first direction is constant.

4. The camera module of claim 1, wherein the fixed frame further comprises first and second driving coils that are included to respectively correspond to the first and second magnets and provide a driving force in the second direction of the moving frame.

5. The camera module of claim 1, wherein:
   the moving frame further comprises a third magnet that is formed at least at a side in the second direction; and
   the fixed frame further comprises a third driving coil that is included to correspond to the third magnet and provides a driving force in the first direction of the moving frame.

6. The camera module of claim 1, wherein:
   the moving frame further comprises a fourth magnet that is formed at least at a side in the second direction; and
   the fixed frame further comprises a fourth driving coil that is included to correspond to the fourth magnet and provides a driving force in an optical axis direction of the moving frame.

7. The camera module of claim 1, wherein the first direction and the second direction are orthogonal to each other.

8. The camera module of claim 1, wherein the first direction is perpendicular to an optical axis direction.

9. A position detector comprising:
   at least one magnet that is movable in a first direction and in a second direction that crosses the first direction;

first and second magnetic sensors that are disposed on two sides in the first direction of the at least one magnet; and a position information generating unit that generates position information of the at least one magnet in the second direction based on a first detection signal detected by the first magnetic sensor and a second detection signal detected by the second magnetic sensor.

10. The position detector of claim 9, wherein the position information generating unit generates position information of the at least one magnet in the second direction based on a third detection signal, which is a sum of the first detection signal and the second detection signal.

11. The position detector of claim 9, wherein a sum of a distance between the first magnetic sensor and the at least one magnet in the first direction and a distance between the second magnetic sensor and the at least one magnet in the first direction is constant.

12. The position detector of claim 9, wherein the first direction and the second direction are orthogonal to each other.

13. A position detection method, the method comprising:

preparing first and second magnetic sensors that are spaced apart from each other in a first direction and at least one magnet that is disposed between the first and second magnetic sensors and is moved in the first direction and a second direction that crosses the first direction;

generating a third detection signal by summing a first detection signal detected by the first magnetic sensor and a second detection signal detected by the second magnetic sensor; and determining a position of the at least one magnet in the second direction based on the third detection signal.

\* \* \* \* \*